United States Patent
Yip et al.

(10) Patent No.: US 8,189,652 B2
(45) Date of Patent: May 29, 2012

(54) METHOD AND APPARATUS FOR DETECTING HIGH-MOBILITY STATE OF MOBILE TERMINAL AND RELATED DEVICE

(75) Inventors: Kun-Wah Yip, Shanghai (HK); Yanzhong Dai, Xian (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 452 days.

(21) Appl. No.: 11/718,802

(22) PCT Filed: Nov. 2, 2005

(86) PCT No.: PCT/IB2005/053562
§ 371 (c)(1),
(2), (4) Date: Jan. 16, 2009

(87) PCT Pub. No.: WO2006/051441
PCT Pub. Date: May 18, 2006

(65) Prior Publication Data
US 2009/0213920 A1    Aug. 27, 2009

(30) Foreign Application Priority Data
Nov. 15, 2004   (CN) .......................... 2004 1 0091039

(51) Int. Cl.
*H04L 27/01* (2006.01)
(52) U.S. Cl. ........ 375/231; 375/346; 375/340; 375/148; 375/144; 375/147
(58) Field of Classification Search .................. 375/231, 375/340, 146, 147, 148, 343
See application file for complete search history.

(56) References Cited

U.S. PATENT DOCUMENTS

| | | | |
|---|---|---|---|
| 6,731,691 B2 * | 5/2004 | Agazzi et al. ................. | 375/285 |
| 6,862,458 B2 * | 3/2005 | Kanemoto et al. ............ | 455/522 |
| 7,139,304 B2 * | 11/2006 | Jou ................................ | 375/147 |
| 2003/0068984 A1 | 4/2003 | Shin et al. | |

(Continued)

FOREIGN PATENT DOCUMENTS

| EP | 1091533 A1 | 4/2001 |
|---|---|---|
| EP | 1300969 A1 | 4/2003 |
| EP | 1328080 A1 | 7/2003 |

OTHER PUBLICATIONS

Turkboylari et al: "An Efficient Algorithm for Estimating the Signal-To-Interference Reation in TDMA Cellular Systems"; IEEE Transactions on Communications, vol. 46, No. 6, Jun. 1998, pp. 728-731.

(Continued)

*Primary Examiner* — Shuwang Liu
*Assistant Examiner* — Dhaval Patel

(57) ABSTRACT

The invention provides a method of detecting high-mobility state of mobile terminal, comprising steps of: estimating a channel impulse response (CIR) based on received signal samples; performing channel equalization based on said received signal samples and the estimated channel impulse response; computing at least one characteristic value for a particular region of a relevant time slot based on the equalized signal samples; and deciding if said at least one characteristic value satisfies a predetermined condition that mobile terminal is in high-mobility state. The invention also provides a corresponding apparatus comprising: a channel estimator; a channel equalizer; computing means for computing at least one characteristic value for a particular region of a relevant time slot based on the equalized signal samples; and deciding means for deciding if said at least one characteristic value satisfies a predetermined condition of mobile terminal being in high-mobility state.

20 Claims, 4 Drawing Sheets

U.S. PATENT DOCUMENTS

2003/0185165 A1    10/2003    Ishii et al.
2004/0001529 A1    1/2004    Cai
2004/0013174 A1*    1/2004    Nuutinen et al. .............. 375/148
2004/0180697 A1    9/2004    Lee

OTHER PUBLICATIONS

Physical Channels and Mapping of Transport Channels Into Physical Channels (TDD); 3GPP TS 25.221 V4.0.0, Technical Specification, Mar. 2011, 89 Page Document.

* cited by examiner

METHOD AND APPARATUS FOR DETECTING HIGH-MOBILITY STATE OF MOBILE TERMINAL AND RELATED DEVICE

FIELD OF THE INVENTION

This invention generally relates to mobile communication systems, and more particularly to a method and apparatus for detecting mobility states of mobile terminals.

BACKGROUND OF THE INVENTION

In conventional mobile communication systems, communication quality is still subject to multi-path dispersion and temporal variation of communication channels. When a mobile terminal is in a high-mobility state, more multi-path dispersion and temporal variation of communication channels are introduced, which further degrades communication quality. Many kinds of technologies for improving communication quality have been disclosed. In order to deal with multi-path dispersion and temporal variation of communication channels produced when the mobile terminal is in a high-mobility state, special procedures and extra processes are necessary. However, existing mobile communication systems lack simple and convenient methods and apparatus for detecting whether a mobile terminal is in a high-mobility state or not. Usually, when whether a mobile terminal is in a high-mobility state or not is not known, various special procedures and extra processes are adopted to improve the communication quality. Due to lack of information on whether the mobile terminal is in a high-mobility state or not, existing mobile communication systems usually waste more power and computing resources, and also defer the communication procedures.

Specifically, the mobile radio channels in TD-SCDMA systems are easily subject to multi-path dispersion and temporal variation. To combat against the adverse effects due to the inter-symbol interference (ISI) introduced by multi-path dispersion, an equalizer is often used to perform channel equalization in the implementation of a receiver. Prior to performing channel equalization, channel impulse response (CIR) estimation must be finished. In TD-SCDMA systems, the CIR can be estimated by utilizing a training sequence (i.e., midamble). The training sequence consists of a number of known training symbols in a time slot. Besides the training symbols as a part of the training sequence, one time slot further includes two data fields and a guard period, as shown in FIG. 1. Strictly speaking, the estimated CIR is only valid over the duration of receiving the training sequence. Nevertheless, channel equalizers typically employ thus estimated CIR for channel equalization also on the data fields, under an implicit assumption that the temporal variation of the channels is so slow that the CIR can be regarded constant over a time slot on which channel equalization is performed. This assumption is reasonable in most communication scenarios where transmitters and/or receivers are stationary or are moving at a low speed. When transmitters and/or receivers are moving at a high speed, however, since the CIR changes considerably over a time slot, this assumption falls short. Therefore, the equalizer performance is degraded, and excessive errors are introduced during the stage of data demodulation.

A slot-based transmission approach (including TD-SCDMA systems) used to more accurately estimate the CIR for mobile communication systems is disclosed by H. Ishii and T. Ishiguro in U.S. patent application No. 2003/0185165A1, "System and Method of Interference Suppression," published on Oct. 2nd, 2003 and assigned to NTT DoCoMo Inc. This patent application is incorporated herein by reference in its entirety. This prior art suggests a more accurate procedure, in which the CIRs are estimated for each time slot based on training sequences of these successive time slots and then interpolation is performed to obtain the instantaneous CIRs for data fields. Although a more accurate estimation of the CIRs for data fields can be obtained and hence a better system performance can be achieved, such procedure needs to perform an additional step of interpolation thereby consuming extra power. In addition, it is possible that time slots assigned to a user are not located in consecutive time slots in the data transmission in a TD-SCDMA system. In this case, the need to estimate the CIRs for adjacent time slots, which are not used for carrying data for this user, increases the power consumption of the receiver. For the above reasons, even if the aforesaid disclosure of U.S. patent application No. 2003/0185165A1 may yield an improvement in the system performance only in high-mobility scenarios, it is preferable to omit the additional step of interpolation so as to save power when the mobile terminal is in a low-mobility state. Especially when the receiver is located in the mobile terminal, it is more necessary to omit the additional step of interpolation, because saving power is very important for a mobile terminal.

For the above reasons, it is apparently necessary to detect whether a mobile terminal is in a high-mobility state or not.

SUMMARY OF THE INVENTION

However, none of the prior art mentions the necessity of detecting whether a mobile terminal is in a high-mobility state or not, and furthermore none discloses methods and apparatus for detecting whether a mobile terminal is in a high-mobility state or not. In addition, a receiver usually has no information on the speed of its movement.

In order to solve the problems described above, the present invention provides the following technical solutions.

The present invention provides a method for detecting whether a mobile terminal is in a high-mobility state or not, comprising steps of:

estimating a channel impulse response (CIR) based on received signal samples;

performing channel equalization based on said received signal samples and the estimated channel impulse response;

computing at least one characteristic value for a particular region of a relevant time slot based on the equalized signal samples; and deciding if said at least one characteristic value satisfies a predetermined condition set for mobile terminals that are in a high-mobility state, to detect whether said mobile terminal is in a high-mobility state or not.

The present invention also provides an apparatus for detecting whether a mobile terminal is in a high-mobility state or not, comprising:

a channel estimator for estimating a channel impulse response based on received signal samples;

a channel equalizer for performing channel equalization based on said received signal samples and the estimated channel impulse response;

computing means for computing at least one characteristic value over a particular region of a relevant time slot based on the equalized signal samples; and deciding means for deciding if said at least one characteristic value satisfies a predetermined condition set for mobile terminals that are in a high-mobility state, to detect whether said mobile terminal is in a high-mobility state or not.

The present invention also provides a receiver, comprising:

receiving means for receiving signals and generating received signal samples;

a channel estimator for estimating a channel impulse response based on the received signal samples;

a channel equalizer for performing channel equalization based on said received signal samples and the estimated channel impulse response;

computing means for computing at least one characteristic value for a particular region of a relevant time slot based on the equalized signal samples; and deciding means for deciding if said at least one characteristic value satisfies a predetermined condition set for receiver that are in a high-mobility state, so as to detect whether said receiver is in a high-mobility state or not.

The present invention also provides a mobile terminal comprising a receiver, said receiver comprising:

receiving means for receiving signals and generating received signal samples;

a channel estimator for estimating a channel impulse response based on the received signal samples;

a channel equalizer for performing channel equalization based on said received signal samples and the estimated channel impulse response;

computing means for computing at least one characteristic value for a particular region of a relevant time slot based on the equalized signal samples; and deciding means for deciding if said at least one characteristic value satisfies a predetermined condition set for mobile terminals that are in a high-mobility state, to detect whether said mobile terminal is in a high-mobility state or not.

According to the method and apparatus of the present invention, it is possible to detect whether a mobile terminal is in a high-mobility state or not only based on received signals. If the mobile terminal is detected in a high-mobility state, some means in the receiver of the mobile terminal will be switched on/off in order to utilize power and network resources more effectively. In mobile communication systems, more effective utilization of the network response enables the receiver to receive and process signals more quickly, and thereby improving system performance. On the other hand, if the mobile terminal is detected in a low-mobility state, means mainly used for high-mobility states in the mobile terminal can be switched off so as to save power of the mobile terminal. The means mainly used for high-mobility states, for example, can be the means disclosed in U.S. patent application No. 2003/0185165A1, or any other means based on dual-antenna reception.

Other objects, features and advantages of the present invention will become more apparent after reading the following detailed description of the preferred embodiments of the present invention in conjunction with the accompanying drawings.

DETAILED DESCRIPTION OF THE INVENTION

The embodiments of the present invention will now be further described in conjunction with the attached drawings.

The present invention is applicable to time division duplex (TDD) mobile communication systems. Each time slot includes a plurality of data segments known to the receiver. For example, such data segments can be training sequences. The mobile communication systems may include a TD-SCDMA system, which has been adopted for use in 3G mobile communication systems. The embodiments of the present invention will be described based on a TD-SCDMA system for convenience. However, it is apparent to those skilled in the art that the contents disclosed here can be applied to any other TDD communication systems.

Figure 1:
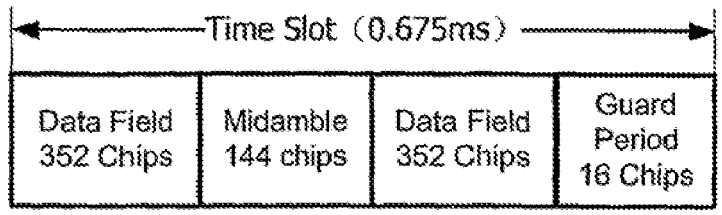
FIG. 1 is a diagram illustrating the structure of a time slot in a TD-SCDMA system.

FIG. 1 is a diagram illustrating the structure of a time slot in a TD-SCDMA system. With regard to the time slot structure shown in FIG. 1, reference may be made to 3GPP TS 25.221 V4.0.0, "Physical Channels and Mapping of Transport Channels into Physical Channels (TDD)".

As shown in FIG. 1, a time slot is divided into time periods for two data fields, a midamble and a guard period. Although the two data fields carrying real-time traffic data are unknown to the receiver beforehand, the receiver has knowledge of the midamble (it contains a sequence of known training symbols) and the data carried during the guard period. Channel estimation is performed based on the received signal obtained during the midamble period. Channel equalization is used to minimize the ISI that is present in the received signal, and then signals as close to the originally transmitted signals as possible are outputted.

When the mobile terminal is in a high-mobility state, the CIR changes considerably over a time slot. Thus, when a CIR estimate derived from the midamble is used, channel equalization, is not effective to reduce the ISI for data carried over the guard period, or even introduces excessive interference due to a mismatched CIR. Therefore, the signal-to-interference ratio (SIR) over the guard period is low after channel equalization.

When the mobile terminal is in a low-mobility state, the ISI is minimized over the guard period so that the corresponding SIR is high.

Since the guard period carries known data, it is possible to compute the SIR. For example, see T. Türkboylari and G. L. Stüber, "An efficient algorithm for estimating the signal-to-interference ratio in TDMA cellular systems," IEEE Transactions on Communications, vol. 46, pp. 728-731, June 1998.

The method for detecting whether a mobile terminal is in a high-mobility state or not according to the present invention comprises steps of:

firstly, estimating a CIR based on received signal samples;

secondly, performing channel equalization based on the received signal samples and the estimated CIR;

then, computing at least one characteristic value over a particular region of a relevant time slot based on the equalized signal samples. This step can be implemented by following substeps:

extracting, from equalized signals, samples belonging to the guard period to form one appropriate matrix (e.g., the first or second embodiments described below with reference to FIGS. 2 and 3) or a plurality of appropriate matrixes (e.g., the third embodiment described below with reference to FIG. 4);

processing the matrix(es) to generate one matrix index (e.g., the SIR in the first embodiment or the interference-to-signal ratio in the second embodiment) or more than one matrix indexes (e.g., the interference power and the desired signal power in the third embodiment). The matrix indexes are used as the characteristic value(s) for the guard period of the relevant time slot.

Finally, deciding if the above one or more characteristic values satisfy a predetermined condition set for mobile terminals that are in a high-mobility state. If the above one or more characteristic values satisfy the predetermined condition set for mobile terminals that are in a high-mobility state, then the mobile terminal is detected in a high-mobility state, and some related processes are performed.

The above step of extracting equalized signal samples to form the matrix(es) and the above step of processing the matrix(es) to generate the matrix indexes can be implemented by any feasible technique in the prior art.

Figure 2:
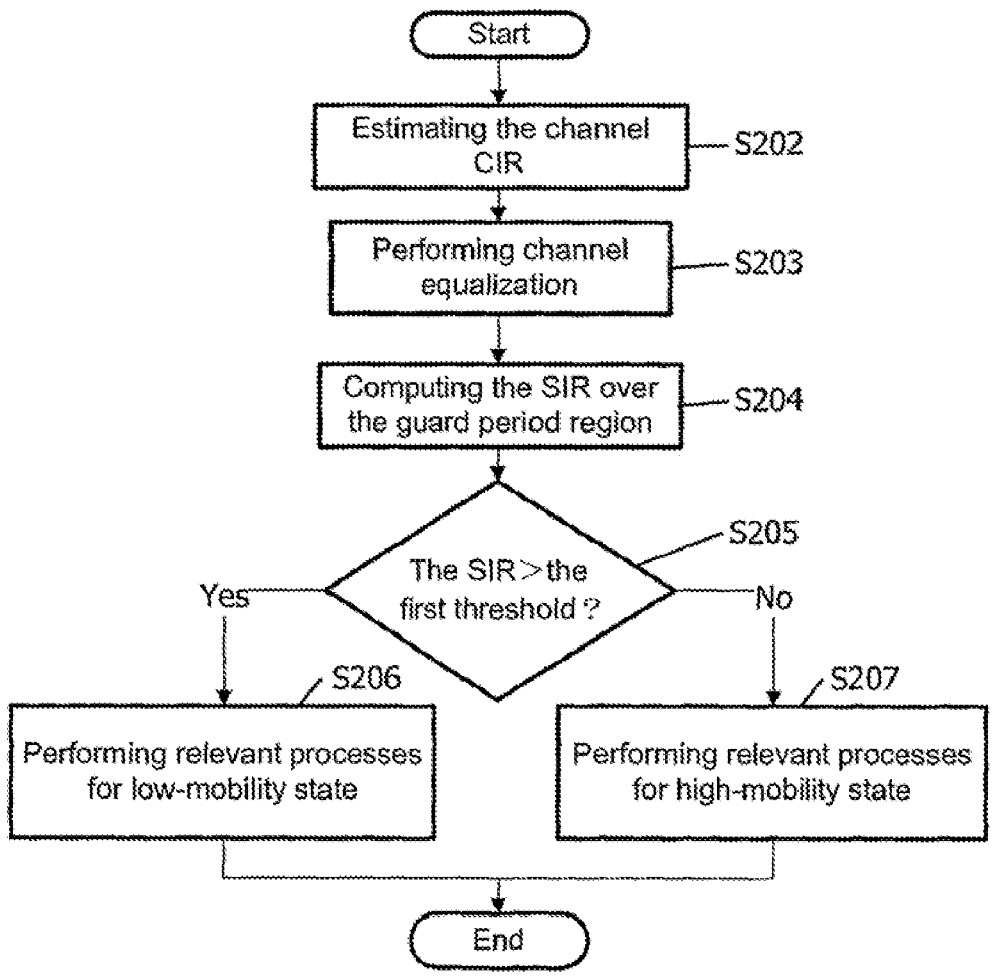
FIG. 2 is a flow chart illustrating the method for detecting whether a mobile terminal is in a high-mobility state or not according to a first embodiment of the present invention.

FIG. 2 is a flow chart illustrating the method for detecting whether a mobile terminal is in a high-mobility state or not according to the first embodiment of the present invention. After the process starts, at step S202, the CIR is estimated based on the received signal samples. At step S203, channel equalization is performed based on the received signal samples and the estimated CIR. At step S204, the SIR over the guard period of the current time slot is computed based on the equalized signal samples.

The above steps S202, S203, and S204 may be implemented by any feasible technique in the prior art. The different techniques for implementing the steps S202, S203, and S204 do not constitute any limitation to the present invention.

Then, at step S205, it is decided if the SIR is higher than a first threshold. When the mobile terminal is in a high-mobility state, the SIR over the guard period should be low. Therefore, some measures, such as simulation experiments, can be taken to determine the upper limit of the SIR over the guard period while the mobile terminal is in a high-mobility state as the first threshold. In this way, if the SIR over the guard period is lower than the first threshold, it can be deemed that the mobile terminal is in a high-mobility state; otherwise, it can be deemed that the mobile terminal is in a low-mobility state.

If the decision result of step S205 is "Yes", the process goes to step S206. At step S206, relevant processes are preformed for the case that the mobile terminal is in a low-mobility state.

If the decision result of step S205 is "No", the process goes to step S207. At step S207, relevant processes are preformed for the case that the mobile terminal is in a high-mobility state.

The above relevant processes for low-mobility state and relevant processes for high-mobility state can be any process in the prior art. For example, at step S206, it is possible to halt the step of interpolation when estimating the CIR for successive time slots, which is described in U.S. patent application No. 2003/0185165A1.

Figure 3:
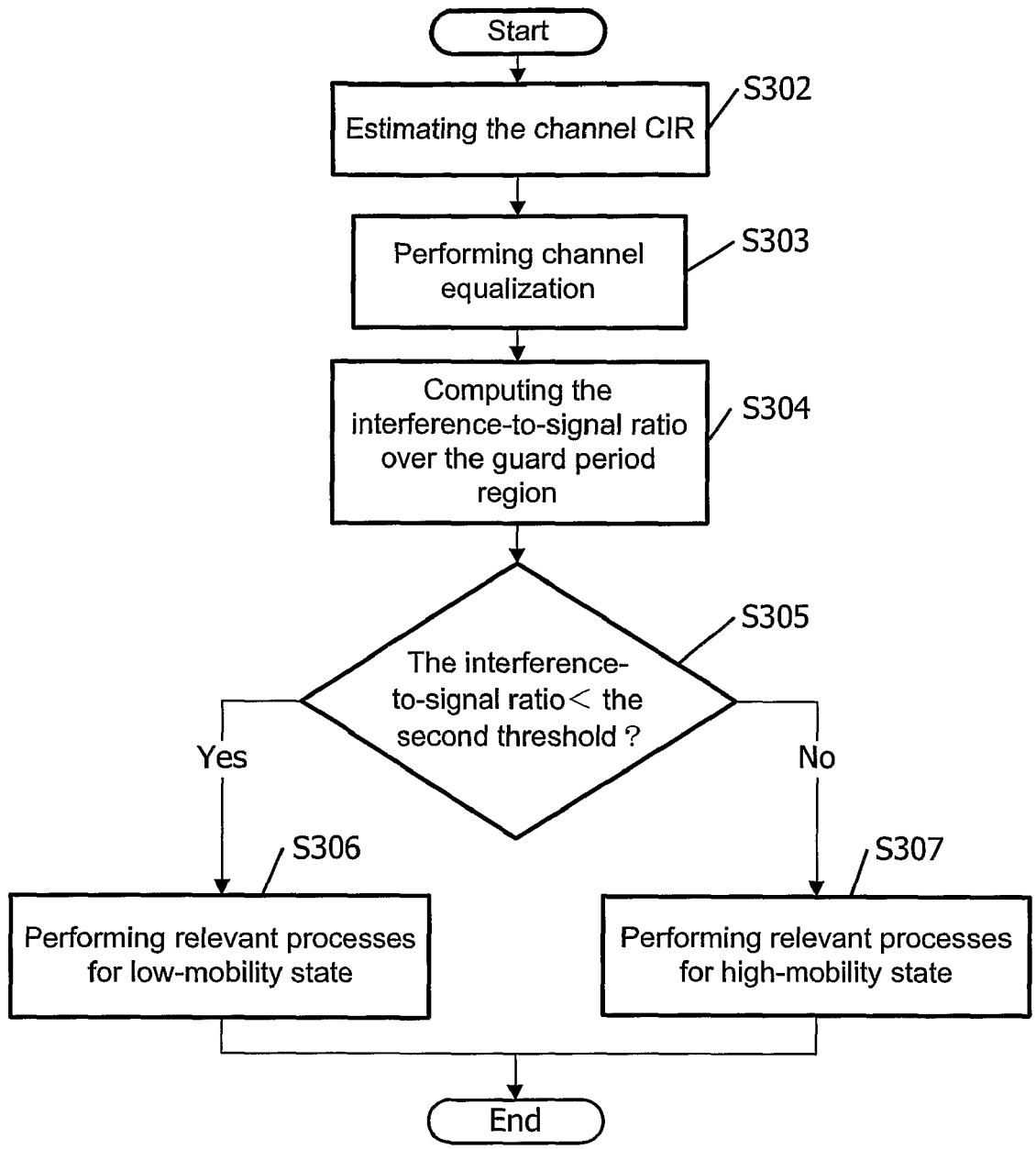
FIG. 3 is a flow chart illustrating the method for detecting whether a mobile terminal is in a high-mobility state or not according to a second embodiment of the present invention.

FIG. 3 is a flow chart illustrating the method for detecting whether a mobile terminal is in a high-mobility state or not according to the second embodiment of the present invention. After the process starts, at step S302, the CIR is estimated based on the received signal samples. At step S303, channel equalization is performed based on the received signal samples and the estimated CIR. At step S304, the interference-to-signal ratio (i.e., the reciprocal of the SIR) over the guard period of the current time slot is computed based on the equalized signal samples.

The above steps S302, S303, and S304 can be implemented by any feasible technique in the prior art. The different techniques for implementing steps S302, S303, and S304 do not constitute any limitation to the present invention.

Then, at step S305, it is decided if the interference-to-signal ratio is lower than a second threshold. When the mobile terminal is in a high-mobility state, the interference-to-signal ratio over the guard period region should be high. Therefore, some measures, such as simulation experiments, can be taken to determine the lower limit of the interference-to-signal ratio over the guard period while the mobile terminal is in a high-mobility state as the second threshold. In this way, if the interference-to-signal ratio over the guard period is higher than the second threshold, it can be deemed that the mobile terminal is in a high-mobility state; otherwise, it can be deemed that the mobile terminal is in a low-mobility state.

If the decision result of step S305 is "Yes", the process goes to step S306. At step s306, relevant processes are preformed for the case that the mobile terminal is in a low-mobility state.

If the decision result of step S305 is "No", the process goes to step S307. At step S307, relevant processes are preformed for the case that the mobile terminal is in a high-mobility state.

The above relevant processes for low-mobility state and relevant processes for high-mobility state can be any process in the prior art. For example, at step S306, it is possible to halt the step of interpolation while estimating the CIR for successive time slots, which is described in U.S. patent application No. 2003/0185165A1.

In the receiver it is much easier to implement the computation of the interference-to-signal ratio than the computation of the SIR. Therefore, the above second embodiment is more easily applied to the receiver than the first embodiment.

Figure 4:
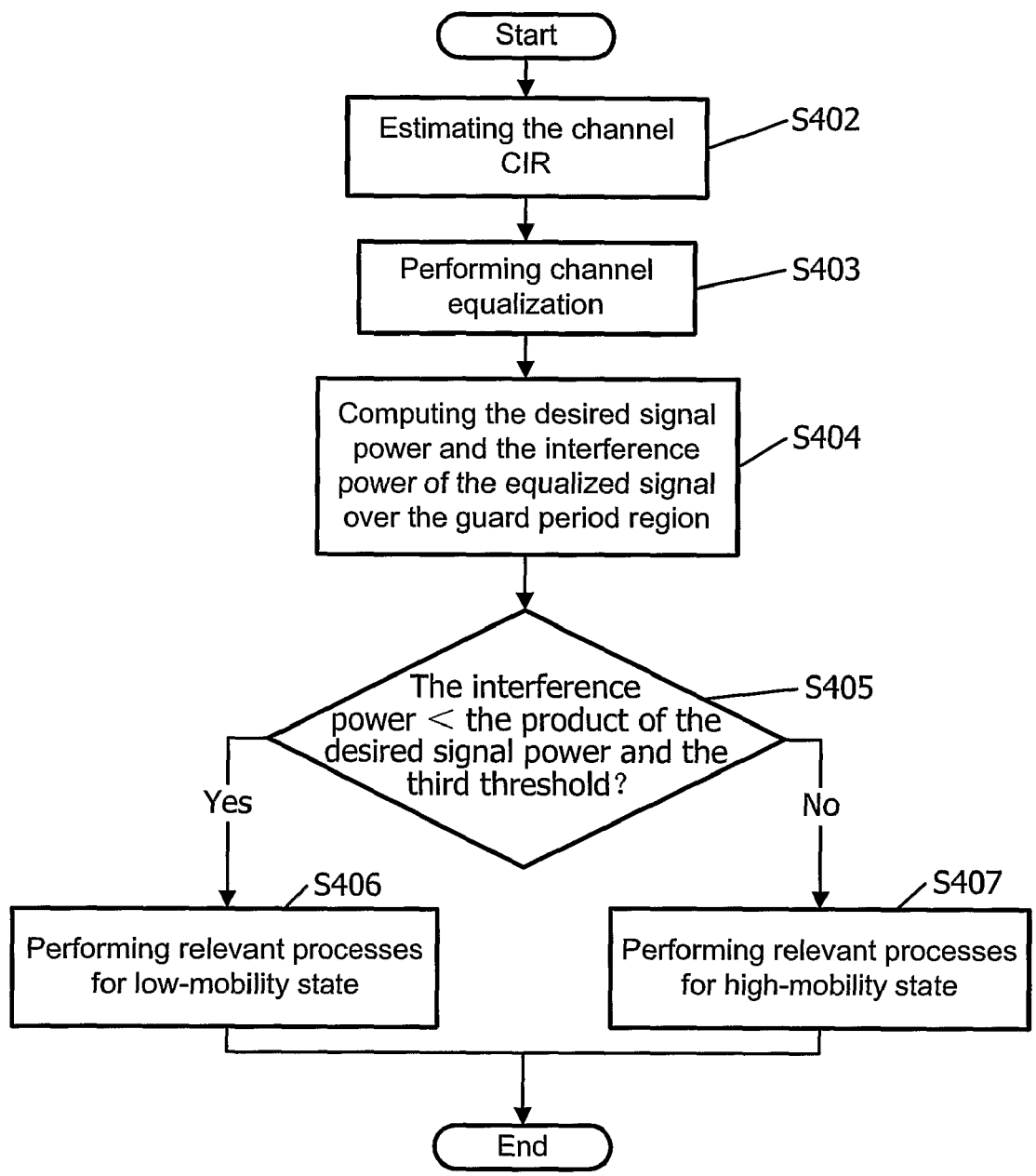
FIG. 4 is a flow chart illustrating the method for detecting whether a mobile terminal is in a high-mobility state or not according to a third embodiment of the present invention.

FIG. 4 is a flow chart illustrating the method for detecting whether a mobile terminal is in a high-mobility state or not according to the third embodiment of the present invention. After the process starts, at step S402, the CIR is estimated based on the received signal samples. At step S403, channel equalization is performed based on the received signal samples and the estimated CIR. At step S404, the desired signal power and the interference power of the equalized signals over the guard period of the current time slot are computed based on the equalized signal samples.

The above steps S402, S403, and S404 can be implemented by any feasible technique in the prior art. The different techniques for implementing the steps S402, S403, and S404 do not constitute any limitation to the present invention. In addition, how to compute the desired signal power and the interference power, which is the common knowledge for those skilled in the art, will not be described in detail herein.

Then, at step S405, it is decided if the interference power is lower than the product of the desired signal power and a third threshold. When the mobile terminal is in a high-mobility state, the interference power should be more than a fraction of the desired signal power. Therefore, some measures, such as simulation experiments, can be taken to determine the lower limit of the ratio of the interference power to the desired signal power while the mobile terminal is in a high-mobility state as the third threshold. In this way, if the interference power over the guard period is higher than the product of the desired signal power and the third threshold, it can be deemed that the mobile terminal is in a high-mobility state; otherwise, it can be deemed that the mobile terminal is in a low-mobility state.

If the decision result of step S405 is "Yes", the process goes to step S406. At step S406, relevant processes are preformed for the case that the mobile terminal is in a low-mobility state.

If the decision result of step S405 is "No", the process goes to step S407. At step S407, relevant processes are preformed for the case that the mobile terminal is in a high-mobility state.

The above relevant processes for low-mobility state and relevant processes for high-mobility state can be any processes in the prior art. For example, at step S406, it is possible to halt the step of interpolation when estimating the CIR for successive time slots, which is described in U.S. patent application No. 2003/0185165A1.

In the receiver, the above third embodiment can be more easily implemented than the first and second embodiments.

Figure 5:
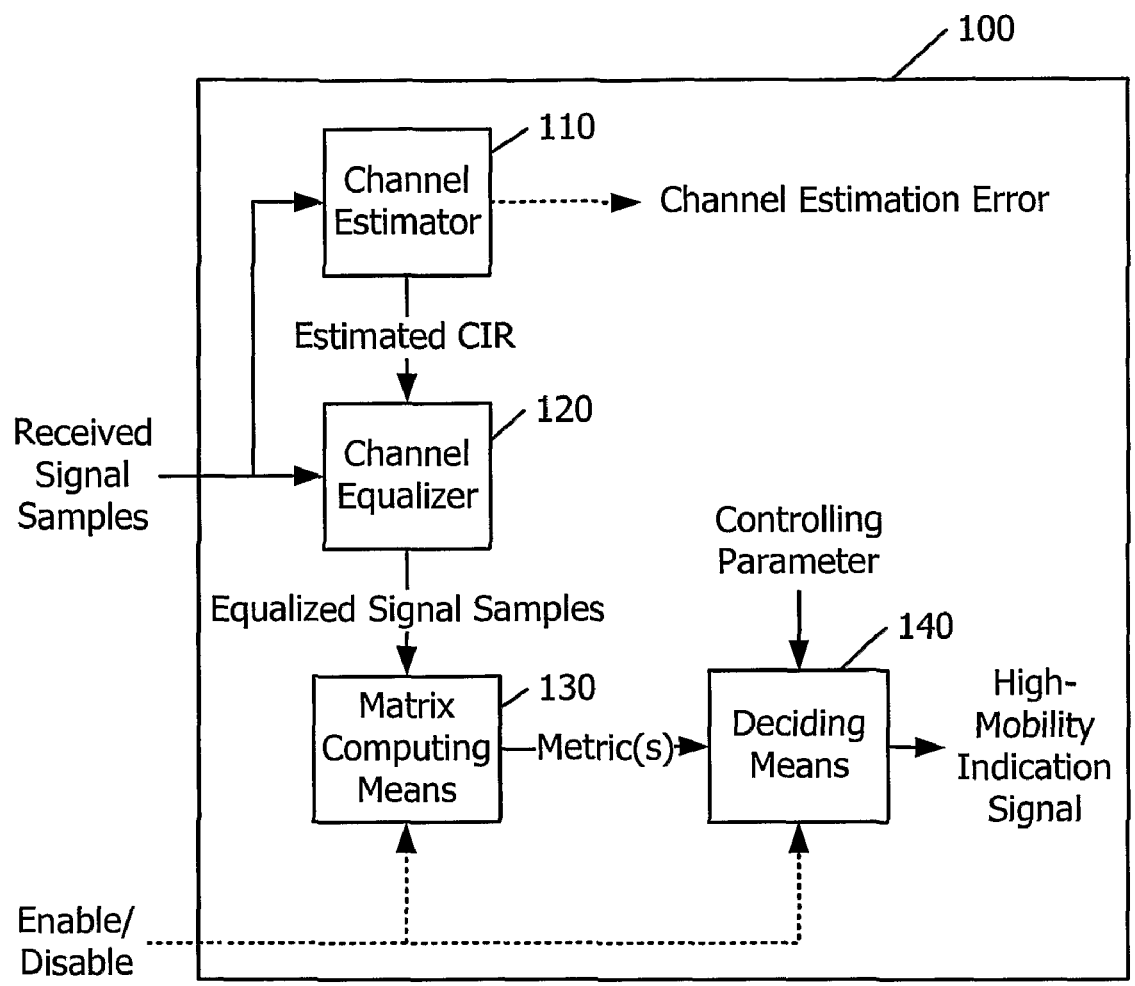
FIG. 5 is a schematic diagram illustrating the structure of the apparatus for detecting whether a mobile terminal is in a high-mobility state or not according to a fourth embodiment of the present invention.

FIG. 5 is a schematic diagram illustrating the configuration of the apparatus for detecting whether a mobile terminal is in a high-mobility state or not according to the fourth embodiment of the present invention. As shown in FIG. 5, the apparatus 100 for detecting high-mobility state comprises a channel estimator 110, a channel equalizer 120, matrix computing means 130 and deciding means 140.

The apparatus 100 for detecting high-mobility state firstly receives inputted mobile communication signals in a time slot, and then feeds these received signal samples to the channel estimator 110 and the channel equalizer 120. The channel estimator 110 processes the received signal samples to generate an estimated CIR, and then sends this estimated CIR to the channel equalizer 120. Optionally, channel estimator 110 can also generate channel estimation error. The function of the channel estimation error will be described below.

The channel equalizer 120 performs channel equalization by using the estimated CIR and the received signal samples to generate a sequence of the equalized signal samples, and then sends the sequence of the equalized signal samples to the matrix computing means 130 for computing at least one characteristic value.

The matrix computing means 130 extracts the equalized signal samples belonging to the guard period of the relevant time slot from the sequence of the equalized signal samples to form one or more matrixes. After that, the matrix computing means 130 performs matrix computation on one or more formed matrixes to generate one or more matrix indexes (i.e., one or more characteristic values), and then sends the computed one or more matrix indexes to the deciding means 140.

With regard to explanations of the one or more matrixes and examples of the one or more matrix indexes, reference may be made to the above description of the first to third embodiments.

The deciding means 140 performs various checks based on the states indicated by the one or more matrix indexes to generate and output a high-mobility indication signal. The deciding means 140 also receives another inputted parameter, i.e., a controlling parameter. The controlling parameter can be, for example, the first threshold, the second threshold or the third threshold as described above.

For example, if the matrix index is the SIR, the controlling parameter can be the first threshold, and the deciding means 140 can be a comparator used to check if the SIR is higher than the first threshold. If the SIR is lower than the first threshold, the receiver is in a high-mobility state; otherwise the receiver is in a low-mobility state. The state is indicated by the high-mobility indication signal.

In another example, if the plurality of relevant matrixes comprise the desired signal power and the interference power, the controlling parameter can be the third threshold, and the deciding means 140 can be a comparator used for checking if the interference power is lower than the product of the desired signal power and the third threshold. If the interference power is higher than the product of the desired signal power and the third threshold, the receiver is in a high-mobility state; otherwise the receiver is in a low-mobility state. The state is indicated by the high-mobility indication signal.

The apparatus 100 for detecting high-mobility state outputs the high-mobility indication signal to other parts of the receiver, so that relevant processes may be performed for low-mobility state or high-mobility state.

In the routine operation of the receiver, some environment conditions may bring adverse effects to the accuracy of detecting whether the receiver is in a high-mobility state or not. Such environment conditions may include the situation where the signal power is too low and/or the channel estimation error is too large. In this way, the decision as to whether a mobile terminal is in a high-mobility state will become unreliable. In this case, it is preferable to switch off the matrix computing means 130 and the deciding means 140 in order to save power. The channel estimation error described in the above can be used for this purpose. That is to say, if the channel estimation error is too large, the matrix computing means 130 and the deciding means 140 can be switched off.

An alternative approach is to provide an external Enable/Disable signal so as to enable or disable the detection as to whether a mobile terminal is in a high-mobility state or not. Therefore, users can selectively control the active/inactive states of the matrix computing means 130 and the deciding means 140.

Although the embodiments of the present invention have been described in conjunction with the attached drawings, those skilled in the art can make various variants or modifications within the scope of the appended claims.

The invention claimed is:

1. A method of detecting whether a mobile terminal is in a high-mobility state or not, comprising steps of:
    estimating a channel impulse response (CIR) based on received signal samples, wherein the received signal samples correspond to a relevant time slot of a mobile communication system transmission;
    performing channel equalization based on (i) said received signal samples and (ii) the estimated channel impulse response, wherein performing the channel equalization minimizes an Inter-Symbol-Interference (ISI) present in the received signal samples to provide equalized signal samples;
    computing at least one characteristic value for a particular region of the relevant time slot based on the equalized signal samples, wherein computing the at least one characteristic value includes
        (a) extracting, from the equalized signal samples, samples belonging to a guard period of the relevant time slot to form (i) one matrix or (ii) a plurality of matrixes, and
        (b) processing (i) the matrix or (ii) the plurality of matrixes to generate one matrix index or more than one matrix index, respectively, wherein the matrix index or the more than one matrix index are used as the characteristic value or values, respectively, for the guard period of the relevant time slot; and
    deciding if said at least one characteristic value satisfies a predetermined condition set for mobile terminals that are in a high-mobility state, to detect whether said mobile terminal is in a high-mobility state or not, wherein if the at least one characteristic value satisfies the predetermined condition set for mobile terminals that are in a high-mobility state, then detecting that the mobile terminal is in a high-mobility state, otherwise, detecting that the mobile terminal is in a low-mobility state.

2. The method according to claim 1, wherein said at least one characteristic value comprises a signal-to-interference ratio over a guard period of the relevant time slot, and said predetermined condition requires that said signal-to-interference ratio be lower than a first threshold, wherein the threshold corresponds to a determined upper limit of the signal-to-interference ratio over the guard period while the mobile terminal is in a high-mobility state.

3. The method according to claim 1, wherein said at least one characteristic value comprises an interference-to-signal ratio over a guard period of the relevant time slot, and said predetermined condition requires that said interference-to-signal ratio be higher than a threshold, wherein the threshold corresponds to a determined lower limit of the interference-to-signal ratio over the guard period while the mobile terminal is in a high-mobility state.

4. The method according to claim 1, wherein said at least one characteristic value comprises (1) desired signal power and (ii) an interference power over a guard period of the relevant time slot, and said predetermined condition requires that said interference power be higher than a product of said desired signal power and a threshold, wherein the threshold corresponds to a determined lower limit of a ratio of the interference power to the desired signal power while the mobile terminal is in a high-mobility state.

5. An apparatus for detecting whether a mobile terminal is in a high-mobility state or not, comprising:
   a channel estimator for estimating a channel impulse response (CIR) based on received signal samples, wherein the received signal samples correspond to a relevant time slot of a mobile communication system transmission;
   a channel equalizer for performing channel equalization based on (i) said received signal samples and (ii) the estimated channel impulse response, wherein performing the channel equalization minimizes an Inter-Symbol-Interference (ISI) present in the received signal samples to provide equalized signal samples;
   computing means for computing at least one characteristic value for a particular region of the relevant time slot based on the equalized signal samples, wherein computing the at least one characteristic value includes
      (a) extracting, from the equalized signal samples, samples belonging to a guard period of the relevant time slot to form (i) one matrix or (ii) a plurality of matrixes, and
      (b) processing (i) the matrix or (ii) the plurality of matrixes to generate one matrix index or more than one matrix index, respectively, wherein the matrix index or the more than one matrix index are used as the characteristic value or values, respectively, for the guard period of the relevant time slot; and
   deciding means for deciding if said at least one characteristic value satisfies a predetermined condition set for mobile terminals that are in a high-mobility state, to detect whether said mobile terminal is in a high-mobility state or not, wherein if the at least one characteristic value satisfies the predetermined condition set for mobile terminals that are in a high-mobility state, then detecting that the mobile terminal is in a high-mobility state, otherwise, detecting that the mobile terminal is in a low-mobility state.

6. The apparatus according to claim 5, wherein said at least one characteristic value comprises a signal-to-interference ratio over a guard period of the relevant time slot, and said deciding means decides that said mobile terminal is in a high-mobility state when said signal-to-interference ratio is lower than a first threshold, wherein the threshold corresponds to a determined upper limit of the signal-to-interference ratio over the guard period while the mobile terminal is in a high-mobility state.

7. The apparatus according to claim 5, wherein said at least one characteristic value comprises an interference-to-signal ratio over a guard period of the relevant time slot, and said deciding means decides that said mobile terminal is in a high-mobility state when said interference-to-signal ratio is higher than threshold, wherein the threshold corresponds to a determined lower limit of the interference-to-signal ratio over the guard period while the mobile terminal is in a high-mobility state.

8. The apparatus according to claim 5, wherein said at least one characteristic value comprises (i) desired signal power and (ii) an interference power over a guard period of the relevant time slot, and said deciding means decides that said mobile terminal is in a high-mobility state when said interference power is higher than a product of said desired signal power and a threshold, wherein the threshold corresponds to a determined lower limit of a ratio of the interference power to the desired signal power while the mobile terminal is in a high-mobility state.

9. The apparatus according to claim 5, wherein said channel estimator further generates a channel estimation error, and when said channel estimation error is higher than a certain value, said computing means and said deciding means do not operate.

10. The apparatus according to claim 5, further comprising means for providing an enable/disable signal to control active/inactive states of said computing means and said deciding means.

11. A receiver, comprising:
   receiving means for receiving signals and generating received signal samples;
   a channel estimator for estimating a channel impulse response based on said received signal samples, wherein the received signal samples correspond to a relevant time slot of a mobile communication system transmission;
   a channel equalizer for performing channel equalization based on (i) said received signal samples and (ii) the estimated channel impulse response, wherein performing the channel equalization minimizes an Inter-Symbol-Interference (ISI) present in the received signal samples to provide equalized signal samples;
   computing means for computing at least one characteristic value for a particular region of the relevant time slot based on the equalized signal samples, wherein computing the at least one characteristic value includes
      (a) extracting, from the equalized signal samples, samples belonging to a guard period of the relevant time slot to form (i) one matrix or (ii) a plurality of matrixes, and
      (b) processing (i) the matrix or (ii) the plurality of matrixes to generate one matrix index or more than one matrix index, respectively, wherein the matrix index or the more than one matrix index are used as the characteristic value or values, respectively, for the guard period of the relevant time slot; and
   deciding means for deciding if said at least one characteristic value satisfies a predetermined condition set for receivers that are in a high-mobility state to detect whether said receiver is in a high-mobility state or not, wherein if the at least one characteristic value satisfies the predetermined condition set for mobile terminals that are in a high-mobility state, then detecting that the mobile terminal is in a high-mobility state, otherwise, detecting that the mobile terminal is in a low-mobility state.

12. The receiver according to claim 11, wherein said at least one characteristic value comprises a signal-to-interference ratio over a guard-period region of the relevant time slot, and wherein said deciding means decides that said receiver is in a high-mobility state when said signal-to-interference'ratio is lower than a threshold, wherein the threshold corresponds to a determined upper limit of the signal-to-interference ratio over the guard period while the mobile terminal is in a high-mobility state.

13. The receiver according to claim 11, wherein said at least one characteristic value comprises an interference-to-signal ratio over a guard period of the relevant time slot, and said deciding means decides that said receiver is in a high-mobility state when said interference-to-signal ratio is higher than a threshold, wherein the threshold corresponds to a determined lower limit of the interference-to-signal ratio over the guard period while the mobile terminal is in a high-mobility state.

14. The receiver according to claim 11, wherein said at least one characteristic value comprises (i) a desired signal power and (ii) an interference power over a guard period of the relevant time slot, and said deciding means decides that said receiver is in a high-mobility state when said interference power is higher than a product of said desired signal power and a threshold, wherein the threshold corresponds to a determined lower limit of a ratio of the interference power to the desired signal power while the mobile terminal is in a high-mobility state.

15. The receiver according to claim 11, wherein said channel estimator further generates a channel estimation error, and when said channel estimation error is higher than a certain value, said computing means and said deciding means do not operate.

16. A mobile terminal comprising a receiver, said receiver comprising:
    receiving means for receiving signals and generating received signal samples;
    a channel estimator for estimating a channel impulse response based on said received signal samples, wherein the received signal samples correspond to a relevant time slot of a mobile communication system transmission;
    a channel equalizer for performing channel equalization based on (i) said received signal samples and (ii) the estimated channel impulse response, wherein performing the channel equalization minimizes an Inter-Symbol-Interference (ISI) present in the received signal samples to provide equalized signal samples;
    computing means for computing at least one characteristic value for a particular region of the relevant time slot based on the equalized signal samples, wherein computing the at least one characteristic value includes
    (a) extracting, from the equalized signal samples, samples belonging to a guard period of the relevant time slot to form (i) one matrix or (ii) a plurality of matrixes, and
    (b) processing (i) the matrix or (ii) the plurality of matrixes to generate one matrix index or more than one matrix index, respectively, wherein the matrix index or the more than one matrix index are used as the characteristic value or values, respectively, for the guard period of the relevant time slot; and
    deciding means for deciding if said at least one characteristic value satisfies a predetermined condition set for mobile terminals that are in a high-mobility state to detect whether said mobile terminal is in a high-mobility state or not, wherein if the at least one characteristic value satisfies the predetermined condition set for mobile terminals that are in a high-mobility state, then detecting that the mobile terminal is in a high-mobility state, otherwise, detecting that the mobile terminal is in a low-mobility state.

17. The mobile terminal according to claim 16, wherein said at least one characteristic value comprises a signal-to-interference ratio over a guard period of the relevant time slot, and wherein said deciding means decides that said mobile terminal is in a high-mobility state when said signal-to-interference ratio is lower than a threshold, wherein the threshold corresponds to a determined upper limit of the signal-to-interference ratio over the guard period while the mobile terminal is in a high-mobility state.

18. The mobile terminal according to claim 16, wherein said at least one characteristic value comprises an interference-to-signal ratio over a guard period of the relevant time slot, and wherein said deciding means decides that said mobile terminal is in a high-mobility state when said interference-to-signal ratio is higher than a threshold, wherein the threshold corresponds to a determined lower limit of the interference-to-signal ratio over the guard period while the mobile terminal is in a high-mobility state.

19. The mobile terminal according to claim 16, wherein said at least one characteristic value comprises (i) desired signal power and (ii) an interference power over a guard period of the relevant time slot, and said deciding means decides that said mobile terminal is in a high-mobility state when said interference power is higher than a product of said desired signal power and a third threshold, wherein the threshold corresponds to a determined lower limit of a ratio of the interference power to the desired signal power while the mobile terminal is in a high-mobility state.

20. The mobile terminal according to claim 16, wherein said channel estimator further generates a channel estimation error, and when said channel estimation error is higher than a certain value, said Computing means and said deciding means do not operate.

* * * * *